May 16, 1967 J. C. BOONSHAFT 3,319,534
PISTON
Filed Jan. 29, 1965
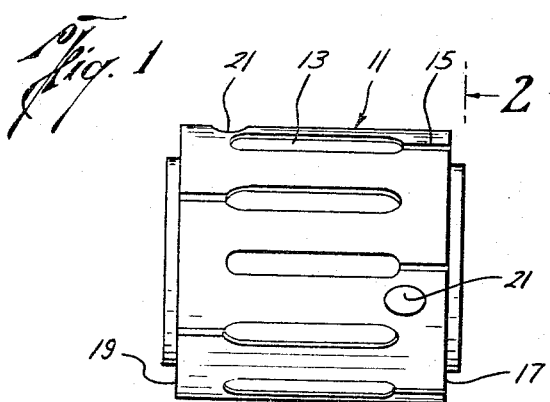
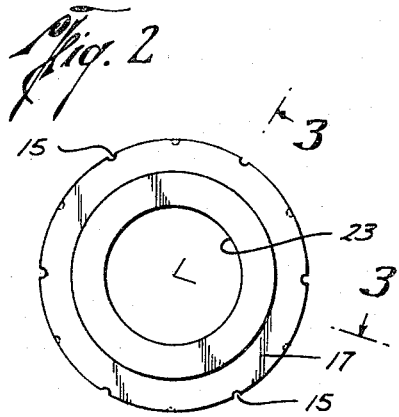
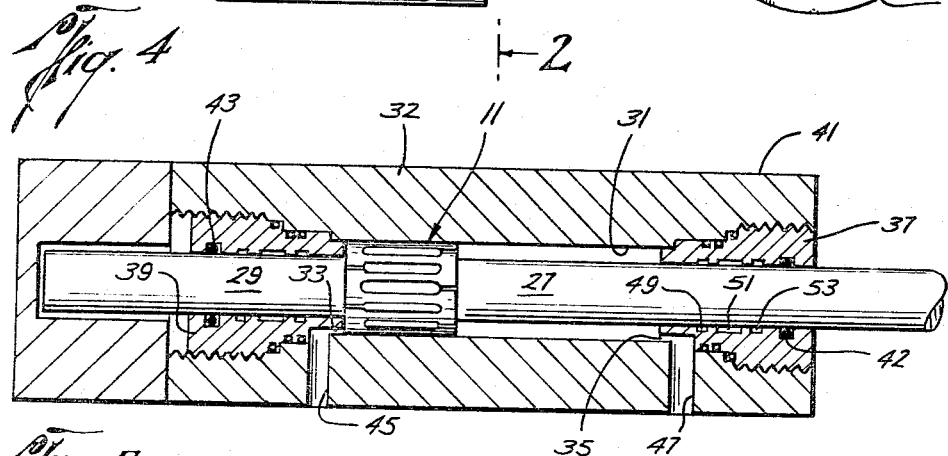
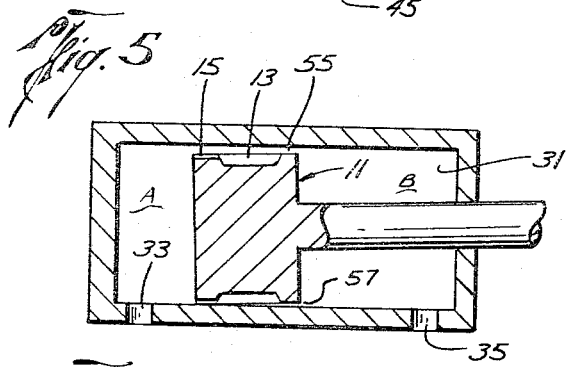
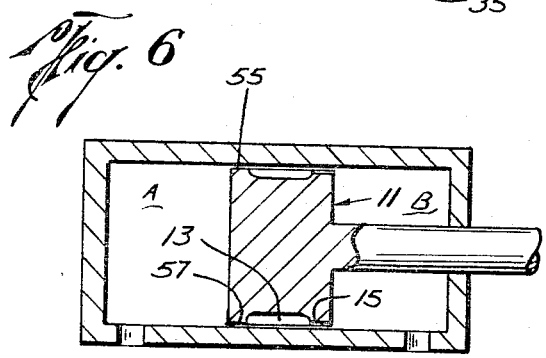
Julius C. Boonshaft
INVENTOR.
BY John E. Holder
ATTORNEY United States Patent Office 3,319,534
Patented May 16, 1967

3,319,534
PISTON
Julius C. Boonshaft, Huntingdon Valley, Pa., assignor to Weston Instruments, Inc., Murray Hill, N.J., a corporation of Texas
Filed Jan. 29, 1965, Ser. No. 428,914
2 Claims. (Cl. 92—162)

This invention relates to an improved piston and, more particularly, to an improved piston for providing hydrostatic support of the piston within a cylinder.

In the construction of high-speed linear actuators, problems are encountered in supporting the moving parts of the actuator mechanism to minimize friction between the working parts of the mechanism. The working parts of such an actuating mechanism normally include a piston closely fitted in a cylindrical bore. Fluid pressure is alternately applied in rapid sequence to the opposite ends of the piston to reciprocate the piston.

In such high speed devices, rapidly varying loads are applied to the piston and piston rod, which loads tend to off-center the piston relative to the longitudinal axis of the cylinder, thereby causing frictional engagement between the piston and cylinder walls and subsequent seizure of the piston in the cylinder bore. Additionally, if a relatively long piston stroke is used in the mechanism, necessitating a long piston rod, the weight of the piston is sufficient to create a substantial bending moment about the supported end of the piston rod to thereby decenter the piston within the cylinder. This same problem may still exist even when a double-ended piston is utilized, that is, a piston having piston rods extending from each end thereof, if the piston stroke is relatively long with respect to the weight of the piston and length and size of the piston rods. Hydraulic actuating mechanisms utilizing such piston and cylinder arrangements are operated at speeds in excess of 50 cycles per second and are often required to maintain reliable operation for more than ten million cycles.

It is, therefore, an object of the present invention to provide a new and improved piston support.

Another object of the present invention is to provide a new and improved piston which is capable of a rapid oscillation within a cylinder and which is hydrostatically supported upon movement in both directions within the cylinder to minimize frictional engagement between the piston and cylinder.

With these and other objects in view, the present invention includes a piston with means thereon to provide fluid support of the piston within a cylinder upon movement of the piston within the cylinder. More particularly, the apparatus comprises a piston having an outer working surface sized for close fitting reception within a cylinder and with at least one piston rod extending from one end of the piston through an end wall of the cylinder. Ports are provided at either end of the cylinder to provide fluid intake and exhaust means for driving the piston in reciprocation. Recesses are formed radially about the piston and are diametrically arranged on the outer surface of the piston intermediate the ends thereof. Passageways connect alternate ones of the recesses with opposite ends of the piston. Upon operation of the piston within the cylinder, the fluid utilized to operate the piston also serves to develop hydrostatic forces in the recesses to maintain the piston centered within the cylinder and thereby minimize friction between the piston and cylinder walls.

A complete understanding of this invention may be had by reference to the following detailed description when read in conjunction with the accompanying drawings illustrating embodiments thereof, wherein:

FIG. 1 is an elevational view of a piston embodying the principles of the present invention;

FIG. 2 is an end view of the piston in FIG. 1;

FIG. 3 is a cross-sectional view of the piston taken along lines 3—3 of FIG. 2;

FIG. 4 shows a piston, embodying the principles of the present invention, used in a hydraulic actuator mechanism; and FIGS. 5 and 6 are schematic illustrations of the piston in operation.

Referring now to FIG. 1, a piston generally designated by the numeral 11 is shown having a series of longitudinal recesses 13 formed in the outer surface thereof intermediate the ends of the piston. The recesses are radially arranged on the outer surface of the piston, parallel to and equidistantly spaced from one another to form diametrical pairs of recesses. Passageways 15, also formed in the surface of the piston, connect alternate ones of the recesses with opposite ends 17 and 19 of the piston. A pair of openings 21 are formed transversely through the piston walls to provide means for fastening the piston to a piston rod. A dividing member 25 is positioned within the bore 23 to divide the bore into two sections for receiving separate piston rods in either end.

FIG. 4 shows part of a hydraulic actuating mechanism including a piston as described above. The piston 11 has a pair of piston rods 27 and 29 received within the ends of the piston and extending therefrom. The piston is slidably received within a cylinder bore 31 which is formed in an actuator cylinder housing 32. Ports or valves 33 and 35 are arranged in the cylinder at opposite ends thereof to provide intake and exhaust means for the fluid used to drive the piston 11 in reciprocation. For purposes of description of the invention, the system will be described as using hydraulic fluid or oil, keeping in mind, however, that many suitable fluids including liquids and gases might be used to drive the piston in reciprocation. Passageways 45 and 47 connect with the ports 33 and 35, respectively, to provide manifold means between hydraulic fluid supply and reservoir means (not shown), and the ports 33 and 35. The hydraulic fluid supply means is under pressure to provide means for moving the piston within the cylinder. Cylinder plugs 37 and 39, are fitted in the ends of the actuator cylinder housing 32 to form the end walls of the cylinder bore 31. Axial bores are formed in each of the plugs for receiving the piston rods 27 and 29 therethrough. Seals 42 and 43 have been provided in the bores of the respective plugs to form a fluid seal between the plugs and the piston rods 27 and 29.

A fluid-type bearing is also provided in the plugs 37 and 39 to support the piston rods. These fluid-type bearings utilize hydraulic fluid leakage or pressure from the hydraulic fluid supply and reservoir means. These bearings may be described by referring to the end plug 37. Three annular grooves 49, 51 and 53 are formed in the interior bore of each plug. The grooves 49 and 53 are connected to the exhaust or fluid reservoir of the actuator mechanism, and the groove 51 is connected to the fluid supply means for the actuator mechanism. Sufficient clearance is provided between the interior bore of the plug and the piston rod to permit the transfer of fluids from the pressure groove 51 to the exhaust grooves 49 and 53 thereby creating a fluid pressure about the piston rod and in effect providing a fluid bearing between the piston rod and the interior bore of the plug.

In order to describe the operation of the above-described means for aligning and supporting the piston 11 within a cylinder, reference will be made to FIGS. 5 and 6. FIG. 5 shows a schematic representation of the piston 11 positioned toward one end of a cylinder 31 having intake and exhaust valves 33 and 35 therein. As represented by the arrows, fluid under pressure is introduced into the cylinder through the valve 33 to move the piston within the cylinder. As the piston 11 moves in response to fluid entering through the valve 33, any fluid behind the piston is displaced from the cylinder through the valve 35.

Assume now that external side loads are applied to the piston rod to cause the piston to be de-centered within the cylinder and therefore positioned closer to one wall of the cylinder than the other when the piston is at rest within the cylinder. This condition is exaggerated in FIG. 5 for purposes of illustration. Next assume that hydraulic fluid under pressure is introduced through the valve 33 to start the piston moving toward the right as illustrated in FIGS. 5 and 6. For purposes of illustration let us call the portion of the cylinder to the left of the piston A, and the portion of the cylinder to the right of the piston B. As the entering fluid develops pressure to the left of the piston in portion A, this same pressured fluid will be introduced into alternate ones of the recesses 13 on the outer surface of the piston, which recesses have passageways 15 opening into the portion A of the cylinder. As the hydraulic fluid pressure developed within portion A extends into the recesses through the passageways 15, such fluid pressure acts radially inwardly upon the piston.

For purposes of illustration, only two of the recesses will be referred to in the description of the operation of the piston, however, it will readily be seen that other diametrical pairs of recesses will function in the same manner. The piston 11 in FIG. 5 is shown in an unaligned or off-center position within the cylinder. This may be caused by the weight of the piston bending the piston rod or by external forces on the rod. The displacement of the piston from center creates an enlarged clearance between the piston and cylinder walls as shown on the upper side of the piston at 55 as viewed in FIG. 5, keeping in mind that the condition is exaggerated for purposes of illustration. At the same time, the clearance 57 between the bottom part of the piston and the cylinder wall, as viewed in FIG. 5, is decreased. Therefore, when fluid under pressure is applied through valve 33 to portion A of the cylinder, such fluid pressure is transmitted through the passageways 15 into the recesses 13 and the spaces 55 and 57. Since the space 55 between the top of the piston and the cylinder wall is comparatively large, as compared to the passageway 15, the pressure in portion A of the cylinder will tend to equalize with a lower pressure in portion B of the cylinder through the enlarged connecting space 55. For example, if the pressure at A were 2000 p.s.i. and the pressure at B were 1000 p.s.i., the pressure developed between the piston and cylinder walls in recess 13 would tend to equalize at an average pressure of 1500 p.s.i. At the same time, the hydraulic oil under pressure in portion A also enters the passageway 15 and recess 13 on the lower side of the piston. Since the clearance in space 57 is much smaller than space 55, the pressure in portion B is not readily transmitted through the smaller space 57 to the recess 13 on the lower side of the piston, thus the pressure in the lower recess 13 will tend to remain near 2000 p.s.i. Therefore, a larger average pressure is developed within the space 57 and recess 13 on the lower side of the piston. Since the resultant average pressure at the bottom of the piston is greater than the pressure at the top, a net resultant force will act upon the piston to raise it upwardly within the cylinder. It is readily seen that when the spaces 55 and 57 become equal, the pressures acting on the piston from above and below will equalize and the resultant force acting on the piston will be zero whereupon the piston will be aligned within the cylinder.

Since alternate ones of the recesses and passageways are connected with the other end of the piston and communicate with portion B of the cylinder (FIG. 6), the piston will also be affected by such equalizing forces on the return stroke of the piston within the cylinder when portion B will be the high pressure or intake side and portion A will be the exhaust side.

Normally in high speed actuating mechanisms the tolerances between the working surfaces are small. FIG. 6 shows the piston and cylinder arrangement in a less exaggerated condition to illustrate the necessity of the restricted passageways 15 when close tolerances exist between the piston and cylinder. When the clearances or spaces 55 and 57 are small, the amount of pressure leakage from the low pressure side of the piston through these spaces is also reduced. The passageways 15 are provided to act as a pressure divider to the high pressure side. This permits the leakage of pressure from the low pressure side to be more effective in the recess 13 and thus create a pressure imbalance which will restore the piston to center.

From the foregoing, it is seen that while at rest, the piston 11 will tend to assume an unaligned position within the cylinder due to the weight of the piston and length of the piston rod or to an external transverse load on the piston rod. However, upon movement of the piston within the cylinder, pressures are developed about the piston which centralize the piston within the cylinder and also provide a hydrostatic support of the piston within the cylinder. This support of the piston maintains the piston centered thereby preventing the piston from frictionally engaging the walls of the cylinder and thus reducing frictional wear to prolong the life of the piston.

While a particular embodiment of the present invention has been shown and described, it is apparent that changes and modifications may be made without departing from this invention in its broader aspects and, therefore, the aim in the appended claims is to cover all such changes and modifications as fall within the true spirit and scope of this invention.

What is claimed is:

1. In a piston and cylinder apparatus, the combination of means for providing radial support of said piston when said piston is operating within said cylinder, which means comprises: valve means at each end of said cylinder providing fluid intake and discharge means for said cylinder; said piston having two end faces and a working surface on said piston sized for close fitting reception within the inner wall of said cylinder, said piston having at least one of said end faces connected to a piston rod; said working surface comprising a smooth outer peripheral wall of said piston having extending from said surface only a plurality of first and second diametrically arranged parallel recesses, said first recesses being equidistantly spaced radially about said piston, said first recesses further being longitudinally elongated and spaced on the working surface of said piston so that said recesses are formed in the outer wall of said piston extending a major portion of the length of said piston intermediate said end faces of said piston; said plurality of second recesses arranged to connect alternate ones of said first recesses with opposite ends of said piston, said second recesses having smaller cross-sectional areas than said first recesses.

2. In a piston and cylinder apparatus for a hydraulic actuating mechanism, the combination of means for developing forces to provide radial support of said piston when said piston is operating within said cylinder, which means comprises:

valve means at each end of said cylinder providing fluid intake and discharge means for said cylinder;
said piston having two end faces and an outer peripheral wall adjacent to and in close fitting reception within the inner wall of said cylinder;
at least one end face of said piston being connected to a piston rod;
said outer peripheral piston wall having a smooth surface and having extending from the surface thereof only (1) a series of parallel recesses and (2) a series of parallel restricted passageway means;

said recesses being equidistantly spaced radially about said piston, said recesses further being longitudinally elongated and spaced on said peripheral wall extending a major portion of said wall between said two end faces; and said passageway means connecting alternate ones of said parallel recesses with opposite end faces of said piston, said passageway means having substantially smaller cross-sectional areas than said recesses.

References Cited by the Examiner

UNITED STATES PATENTS

| | | | |
|---|---|---|---|
| 495,221 | 4/1893 | Greene | 92—185 |
| 683,469 | 10/1901 | Imler | 92—181 |
| 1,167,975 | 1/1916 | Burlingham | 92—172 X |
| 3,035,879 | 5/1962 | Hanny | 92—181 X |
| 3,153,987 | 10/1964 | Thoma | 92—181 X |

MARTIN P. SCHWADRON, *Primary Examiner.*

G. N. BAUM, *Assistant Examiner.*

Disclaimer and Dedication 3,319,534.—*Julius C. Boonshaft*, Huntingdon Valley, Pa. PISTON. Patent dated May 16, 1967. Disclaimer and dedication filed Feb. 4, 1970, by the assignee, *Weston Instruments, Inc.*

Hereby enters this disclaimer to the entire remaining term of said patent and dedicates the patent to the Public.

[*Official Gazette May 26, 1970.*]